(12) United States Patent
Yamada

(10) Patent No.: US 10,703,264 B2
(45) Date of Patent: Jul. 7, 2020

(54) INTERIOR PART COMBINED STRUCTURE

(71) Applicant: TOYOTA BOSHOKU KABUSHIKI KAISHA, Aichi-ken (JP)

(72) Inventor: Takamasa Yamada, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/968,268

(22) Filed: May 1, 2018

(65) Prior Publication Data
US 2018/0339650 A1 Nov. 29, 2018

(30) Foreign Application Priority Data
May 24, 2017 (JP) ................... 2017-103101

(51) Int. Cl.
| B60Q 3/64 | (2017.01) |
|---|---|
| F21V 8/00 | (2006.01) |
| B60Q 3/54 | (2017.01) |
| B60Q 3/217 | (2017.01) |
| D03D 15/00 | (2006.01) |
| B60Q 3/74 | (2017.01) |
| D03D 1/00 | (2006.01) |

(Continued)

(52) U.S. Cl.
CPC ............... *B60Q 3/64* (2017.02); *B60Q 3/217* (2017.02); *B60Q 3/54* (2017.02); *B60Q 3/745* (2017.02); *D03D 1/00* (2013.01); *D03D 15/00* (2013.01); *D03D 15/0094* (2013.01); *G02B 6/001* (2013.01); *B60Q 3/14* (2017.02); *B60Q 2500/10* (2013.01); *B60R 13/02* (2013.01); *D10B 2401/20* (2013.01); *D10B 2505/12* (2013.01)

(58) Field of Classification Search
CPC ........ B60Q 2500/10; B60Q 3/54; B60Q 3/66; B60Q 3/745; G02B 6/0006; G02B 6/08
USPC .................. 362/459–549, 551–582
See application file for complete search history.

(56) References Cited

U.S. PATENT DOCUMENTS

| 4,977,487 A * | 12/1990 | Okano ...................... B60Q 1/50 |
|---|---|---|
| | | 362/555 |
| 2014/0211498 A1* | 7/2014 | Cannon .................... B60Q 3/54 |
| | | 362/555 |

FOREIGN PATENT DOCUMENTS

| EP | 2267204 A1 | 12/2010 |
|---|---|---|
| EP | 3072743 A2 | 9/2016 |

(Continued)

OTHER PUBLICATIONS

Extended European Search Report received in Appl. No. 18 17 1781.0, dated Oct. 2, 2018.

*Primary Examiner* — William J Carter
(74) *Attorney, Agent, or Firm* — Greenblum & Bernstein, P.L.C.

(57) ABSTRACT

An interior part combined structure includes a first interior part with a second interior part. The first interior part includes a first base and a design material attached to the first base so as to cover at least a part of a surface of the first base. The second interior part includes a second base provided so as to cover an end part of the first base. The design material is a woven fabric woven by using synthetic resin fibers and side emission type optical fibers as warps or wefts. The side emission type optical fibers each include one end part to which a light source is connected. The one end part includes an end surface facing a light emitting part of the light source. The second base includes a bent end part. The bent end part includes an end surface brought into contact with or facing the design material.

12 Claims, 3 Drawing Sheets

(51) Int. Cl.
*B60R 13/02* (2006.01)
*B60Q 3/14* (2017.01)

(56) References Cited

FOREIGN PATENT DOCUMENTS

JP       2010-267573       11/2010
WO    WO-2008062141 A2 *   5/2008    ............. G02B 6/001

* cited by examiner

[Fig. 1]
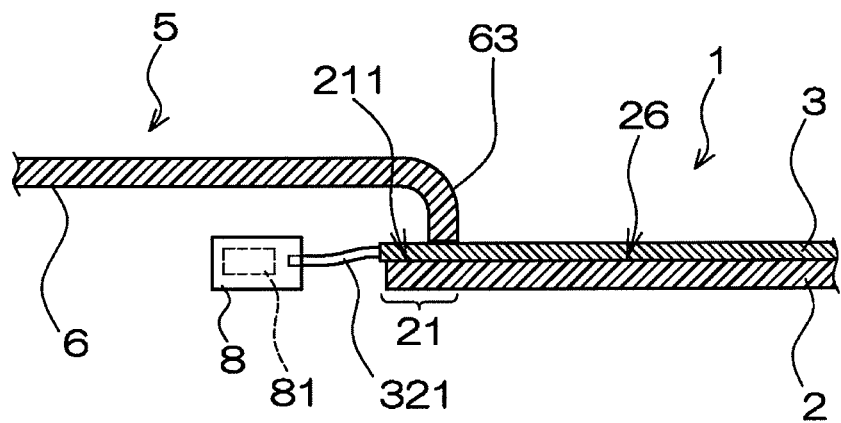
[Fig. 2]
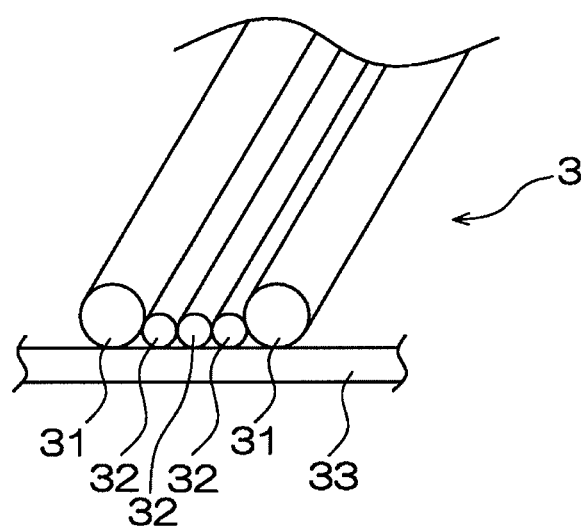
[Fig. 3]
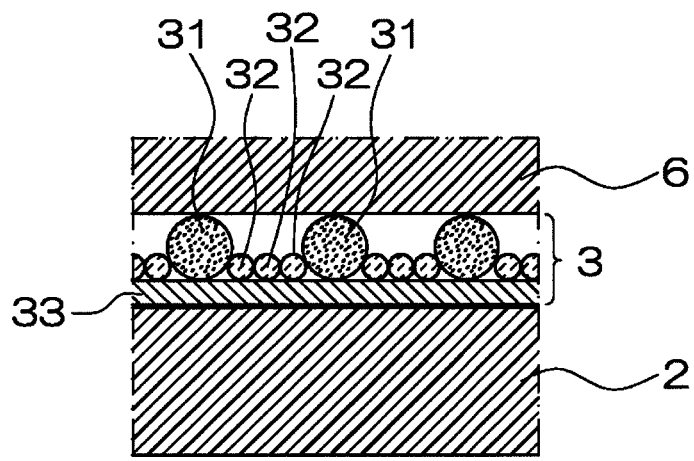

[Fig. 4]
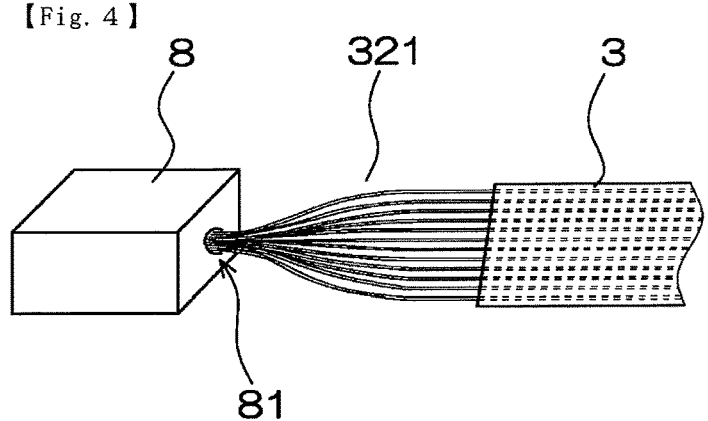
[Fig. 5]
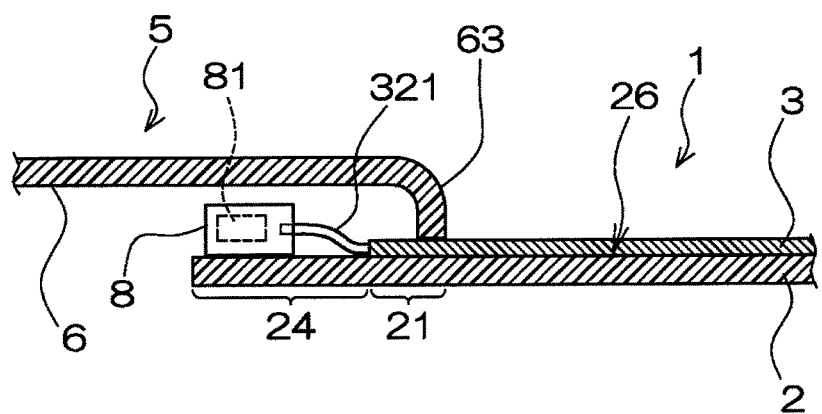
[Fig. 6]
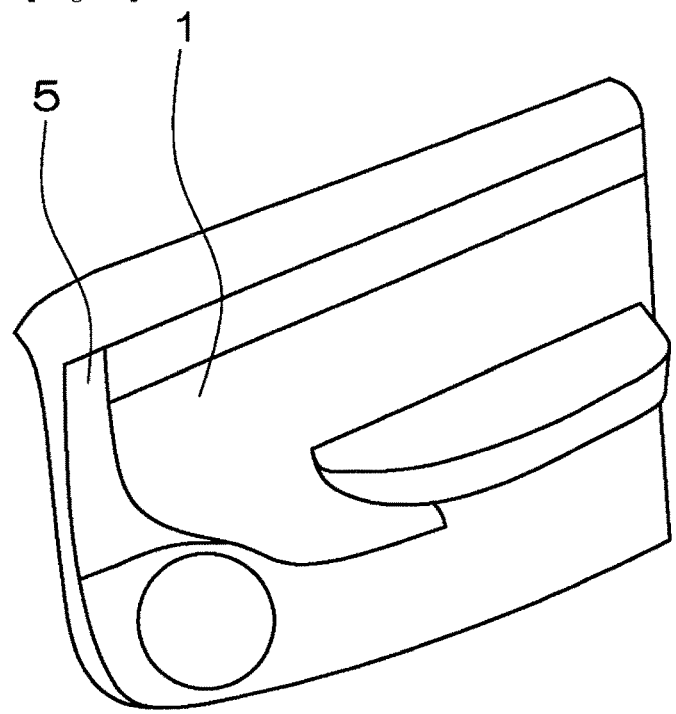

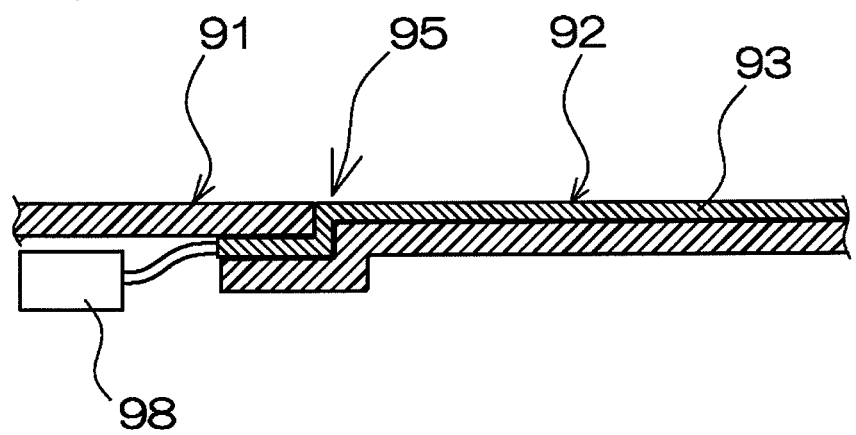
[Fig. 7]

ND STRUCTURE

CROSS-REFERENCE TO RELATED APPLICATIONS

The present application claims priority under 35 U.S.C. § 119 of Japanese Application No. 2017-103101 filed on May 24, 2017, the disclosure of which is expressly incorporated by reference herein in its entirety.

BACKGROUND

1. Technical Field

The present invention relates to an interior part combined structure which includes: a vehicle interior design surface formed by side emission type optical fibers; and a design material functioning as lighting. In more detail, the present invention relates to an interior part combined structure capable of preventing the loss of light passing through optical fibers in a combined portion of interior parts.

2. Related Art

There have been considered various interior parts including side emission type optical fibers capable of leaking light from a side surface to wholly emit the light.

For example, there is known an optical fiber woven fabric obtained by weaving optical fibers and normal yarns as warps or wefts, including a light source delivering light to at least one end part of the optical fibers, and functioning as an illumination device which allows for entrance of light from the light source into the optical fibers, and thus can be utilized as an automobile interior part such as a door trim and a small part (for example, see Japanese Unexamined Patent Application Publication No. 2010-267573). This literature explains that the uneven light emission of the optical fiber woven fabric can be reduced by regularly weaving the optical fibers and the normal yarns in the optical fiber woven fabric to control a woven texture and emission luminance to be in predetermined states.

SUMMARY

In the optical fiber woven fabric described in Japanese Unexamined Patent Application Publication No. 2010-267573, the uneven light emission can be reduced by controlling the woven texture and emission luminance to be in predetermined states. However, in Japanese Unexamined Patent Application Publication No. 2010-267573, an end part of the optical fiber woven fabric has not been considered.

For example, when an optical fiber woven fabric is attached to the surface of a conventional interior part, as exemplified in FIG. 7, a jointed portion 95 between interior parts 91, 92 generally has a bent structure. An end part of an optical fiber woven fabric 93 is bent along the shape of the jointed portion 95, which causes light propagated from a light source 98 to largely leak from the bent portion of the jointed portion 95, so that the exposed surface is not allowed to sufficiently emit light. This problem is not mentioned at all.

The present invention has been made in view of the above-described circumstances of the prior art. It is an object of the present invention to provide an interior part combined structure capable of preventing the loss of light passing through optical fibers in a combined portion of interior parts.

In order to solve the above problem, a first aspect of the invention provides an interior part combined structure obtained by combining a first interior part with a second interior part, the first interior part including a first base and a design material attached to the first base so as to cover at least a part of a surface of the first base, the second interior part including a second base provided so as to cover an end part of the first base, wherein: the design material is a woven fabric woven by using synthetic resin fibers and side emission type optical fibers as warps or wefts; the side emission type optical fibers each include one end part to which a light source is connected; the one end part includes an end surface facing a light emitting part of the light source; the second base includes a bent end part; and the bent end part includes an end surface brought into contact with or facing the design material.

A second aspect of the invention provides the interior part combined structure according to the first aspect of the invention, wherein: the first base includes an extended part extended to a tip side of the attached design material, and the light source is disposed on a surface of the extended part; and the light source is covered with the second base.

A third aspect of the invention provides the interior part combined structure according to the first or second aspect, wherein: the side emission type optical fibers are woven between the synthetic resin fibers; and a ratio ($d_S/d_f$) of fineness ($d_S$) of the synthetic resin fibers to fineness ($d_f$) of the side emission type optical fibers is from 1.5 to 7.0.

A fourth aspect of the invention provides the interior part combined structure according to the third aspect, wherein: the synthetic resin fibers are multifilaments; and a ratio ($d_{S1}/d_f$) of fineness ($d_{S1}$) of the multifilaments to fineness ($d_f$) of the side emission type optical fibers is from 2.0 to 7.0.

A fifth aspect of the invention provides the interior part combined structure according to the third aspect, wherein: the synthetic resin fibers are monofilaments; and a ratio ($d_{S2}/d_f$) of fineness ($d_{S2}$) of the monofilaments to fineness ($d_f$) of the side emission type optical fibers is from 1.5 to 6.0.

In the interior part combined structure of the present invention, the end part of the second base is bent, and the end surface of the bent end part is brought into contact with or faces the design material, whereby the bent portion can be eliminated from the end part of the design material attached to the surface of the first base. This eliminates the bent portions of the side emission type optical fibers woven into the design material, whereby the loss of propagation of light caused by the bending can be eliminated, and the end part of the first base and the like can be concealed so as not to be unnecessarily exposed in a boundary portion between the first interior part and the second interior part.

The first base includes an extended part extended to a tip side of the attached design material, and the light source is disposed on the surface of the extended part. When the light source is covered with the second base, the first interior part integrally provided with the light source can be provided, which can eliminate the use of the step of disposing the light source. The light source and the optical fibers between the light source and the design material can be protected so as to be sandwiched between the first base and the second base. During assembling, traveling of a vehicle, and the like, the light source, and the optical fibers between the light source and the design material can be protected so as to prevent impact, vibration, and the like from causing the light source and the optical fibers to be brought into contact with other regions.

The side emission type optical fibers are woven between the synthetic resin fibers. When a ratio ($d_S/d_f$) of the fineness ($d_S$) of the synthetic resin fibers to the fineness ($d_f$) of the side emission type optical fibers is from 1.5 to 7.0, the use of the synthetic resin fiber having fineness within an appropriate range causes the side emission type optical fibers to be positioned inward relative to the synthetic resin fibers without appearing on the outermost surface of the design material, and prevents the abrasion and scratch of the side emission type optical fibers caused by the contact with an occupant, the bent end part of the second base, and other articles, or suppresses at least the abrasion and scratch. Moreover, it is prevented that the fineness of the synthetic resin fibers is excessive to impair the appearance of the design material, and that light emission from the side emission type optical fibers is shielded to impair the design property of the design material.

When the synthetic resin fibers are multifilaments, and the ratio ($d_{S1}/d_f$) of the fineness ($d_{S1}$) of the multifilaments to the fineness ($d_f$) of the side emission type optical fibers is from 2.0 to 7.0, the fineness of the multifilaments is not excessively small. Even when the multifilaments are abraded, the abrasion and scratch of the side emission type optical fibers can be sufficiently suppressed.

When the synthetic resin fibers are monofilaments, and the ratio ($d_{S2}/d_f$) of the fineness ($d_{S2}$) of the monofilaments to the fineness ($d_f$) of the side emission type optical fibers is from 1.5 to 6.0, the abrasion and scratch of the side emission type optical fibers can be sufficiently suppressed even if the fineness of the monofilaments is decreased as compared with the multifilaments.

BRIEF DESCRIPTION OF DRAWINGS

The present invention will be further described in the following detailed description by way of non-limiting examples of typical embodiments according to the present invention and with reference to a plurality of drawings referred to herein. Similar reference numerals represent similar parts in some of the drawings.

FIG. 1 is a schematic cross-sectional view for explaining an interior part combined structure.

FIG. 2 is a schematic illustration diagram showing a difference in fineness between synthetic resin fibers of a design material and optical fibers.

FIG. 3 is a schematic illustration diagram showing a state where synthetic resin fibers of a design material are brought into contact with a bent end part of a second base, and optical fibers are protected so as not to be brought into contact with the bent end part and the like by the synthetic resin fibers.

FIG. 4 is a schematic diagram showing connection between side emission type optical fibers and a light source.

FIG. 5 is a schematic cross-sectional view for explaining an interior part combined structure in which a light source is disposed on an extended part of a first base.

FIG. 6 is a schematic perspective view showing an example of a door trim to which the interior part combined structure is applied.

FIG. 7 is a schematic cross-sectional view for explaining a conventional interior part combined structure.

DETAILED DESCRIPTION

Hereinafter, the present invention will be described in detail with reference to the drawings.

The particulars shown herein are by way of example and for purposes of illustrative discussion of embodiments of the present invention only, and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, and the description is taken with the drawings, making apparent to those skilled in the art how some forms of the present invention may be embodied in practice.

This interior part combined structure is a combined structure obtained by combining a first interior part (1) with a second interior part (5) (see FIG. 1). This combined structure is an interior part combined structure in various fields such as vehicles (automobiles, railroad vehicles, and the like), aircrafts, ships, and buildings. Specific examples of the interior part include a door trim of a passenger vehicle (see FIG. 6), a dashboard, and a console box. The first interior part (1) and the second interior part (5) can be obtained by dividing surface portions of the interior parts.

The way of combining the first interior part (1) with the second interior part (5) for the exemplified interior part can be optionally selected. For example, when the door trim is configured by the combination of a lower trim with an upper trim, the lower trim may be the first interior part (1) and the upper trim may be the second interior part (5). The upper trim may be the first interior part (1) and the lower trim may be the second interior part (5).

The first interior part (1) includes a first base (2) and a design material (3) attached to the first base (2) so as to cover the surface of at least a part of the first base (2) (see FIG. 1). The first interior part (1) may further include an optional member such as a fixture or a dressed lumber.

The first base (2) is a base portion of the first interior part (1), and is usually a molded body made of a synthetic resin. In the first base (2), a surface (211) [a surface to which the design material (3) is attached] of an end part (21) covered with a second base (6) preferably has a substantially flat shape with respect to the axial direction of side emission type optical fibers (32). The term "substantially flat" means a plane, or a curved surface having a larger bending radius than the minimum allowable bending radius (for example, from 30 to 35 mm) of the side emission type optical fibers (32) to be used. This is because a bent part is prevented from occurring in the design material (3) to be attached. In the first base (2), a light emitting surface (26) as a surface to which the design material (3) is attached, also preferably has a substantially flat shape with respect to the axial direction of the side emission type optical fibers (32) as with the surface of the end part (21).

A curved surface having an optional bending radius may be formed in a direction orthogonal to the axial direction of the side emission type optical fibers (32) in the end part side surface (211) and the light emitting surface (26). This is because the bending of the side emission type optical fibers (32) caused by the curved surface does not occur, so that propagation loss caused by the bending does not occur.

The type of a synthetic resin used for the first base (2) is not particularly limited, and polyolefin-based resins such as polyethylene and polypropylene, and polyamide-based resins such as nylon 6 and nylon 66 are used. Among these synthetic resins, polypropylene is preferable from the viewpoints of easiness to mold, strength, and the like. A fiber reinforced resin including glass fibers, carbon fibers, or the like can be used in order to improve physical properties such as rigidity.

In the method for producing the first base (2), the first base (2) can be molded into a predetermined interior part shape by, for example, a press-molding method in which heating and pressing are performed using a mold.

The design material (3) is a woven fabric woven by using synthetic resin fibers (31) and the side emission type optical fibers (32) as warps or wefts (see FIGS. 2 and 3). The design material (3) may cover at least a part of the surface of the first base (2). A place which becomes "at least a part" is a place corresponding to the light emitting surface (26) of the first base (2) and requiring light emission provided by a fabric, and a place connected to a light source (8) corresponding to the end part side surface (211) of the first base (2). The first base (2) may be exposed without covering the first base (2) except for the above-mentioned places with the design material (3). The design material (3) is attached to the first base (2) such that the side emission type optical fibers (32) are not bent at a radius smaller than the minimum allowable bending radius depending on the surface shapes of the end part side surface (211) of the first base (2) and light emitting surface (26).

The type of the woven texture of the design material (3) is not particularly limited, and is appropriately selected depending on the application. Whether the synthetic resin fibers (31) and the side emission type optical fibers (32) are woven as warps or wefts is not particularly limited, and can be appropriately set depending on the types of the woven texture, loom used, and the like. The loom used for weaving the design material (3) is not particularly limited, and examples thereof include a rapier loom, a jacquard loom, and a dobby loom.

The material of the synthetic resin fibers (31) is not particularly limited, and fibers made of various synthetic resins can be used. Examples of the synthetic resin include polyamide-based resins such as nylon 6 and nylon 66; polyester-based resins such as polyethylene terephthalate, polybutylene terephthalate and polytrimethylene terephthalate; polyacryl-based resins; and polyolefin-based resins such as polypropylene. As the synthetic resins, polyamide-based resins and polyester-based resins are particularly preferred. The synthetic resin fibers (31) may be monofilaments or multifilaments.

The side emission type optical fibers (32) are normally composed of a core layer and a clad layer, and have a structure such that the outer periphery of the core layer is covered with the clad layer. Then, depending on the material, refractive index, reflectance, and the like of each of the core layer and the clad layer, side emission type optical fibers can be obtained, which appropriately leaks light from the side surface to emit the light. Furthermore, each of the core layer and the clad layer may be a single layer or has a stacked structure of a plurality of layers. Examples of the side emission type optical fibers (32) include various optical fibers such as optical fibers made of a resin and quartz-based optical fibers. Since the optical fibers used in the present invention are woven into the woven fabric, optical fibers made of a resin which are flexible, have excellent bending impact and the like, and can be easily woven are used.

Furthermore, the diameter of the existing optical fibers made of a resin is from about 0.1 to 10 mm, but from the viewpoint of easiness of weaving, reduction of uneven light emission, or versatility, there are used side emission type optical fibers having a diameter of preferably from 0.15 to 1.5 mm, particularly preferably from 0.15 to 1.0 mm, and further particularly preferably from 0.15 to 0.4 mm. Furthermore, the fineness of the side emission type optical fibers made of a resin depends on the types of resins constituting the core layer and the clad layer. For example, as described above, when the diameter is 0.25 mm, the side emission type optical fibers have fineness of 607 dtex. A preferable fineness range is determined by a preferable fineness ratio of the fineness of each of the multifilaments and the fineness of the monofilaments to the fineness of the side emission type optical fibers.

As the core layer of the optical fibers made of a resin, there are preferably used resins having excellent transparency: for example, acrylic resins such as polymethyl methacrylate, polyethyl methacrylate and polyethyl acrylate; polycarbonate resins; polystyrene resins; and polyolefin-based resins. Furthermore, as the clad layer, there are preferably used resins having excellent transparency and a refractive index smaller than that of the core layer: for example, vinylidene fluoride resins, vinylidene fluoride-tetrafluoroethylene copolymer resins, polychlorotrifluoroethylene resins and trifluoroisopropyl methacrylate resins.

The side emission type optical fibers (32) can be woven between the synthetic resin fibers (31). At this time, the ratio ($d_S/d_f$) of the fineness ($d_S$) of the synthetic resin fibers (31) to the fineness ($d_f$) of the side emission type optical fibers (32) is preferably from 1.5 to 7.0. The above range causes the side emission type optical fibers (32) to be positioned inward relative to the synthetic resin fibers (31) without appearing on the outermost surface of the design material (3), and prevents the abrasion and scratch of the side emission type optical fibers (32), or suppresses at least the abrasion and scratch.

The ratio ($d_S/d_f$) is preferably set to be within a more appropriate range depending on whether the synthetic resin fibers (31) are multifilaments or monofilaments. More specifically, when the synthetic resin fibers (31) are the multifilaments, the ratio ($d_S/d_f$) is preferably set to be within a larger numerical range within the above numerical range. On the other hand, when the synthetic resin fibers (31) are the monofilaments, the ratio ($d_S/d_f$) is preferably set to be within a smaller numerical range within the above numerical range.

For example, when the multifilaments are used as the synthetic resin fibers (31), the ratio ($d_{S1}/d_f$) of the fineness ($d_{S1}$) of the multifilaments to the fineness ($d_f$) of the side emission type optical fibers (32) is preferably from 2.0 to 7.0, more preferably from 3.0 to 7.0, and particularly preferably from 4.5 to 7.0. Thus, when the synthetic resin fibers (31) are the multifilaments, abrasion caused by the contact of the multifilaments with an occupant and other articles, and deformation caused by pressing are apt to occur as compared with the case of the monofilaments, so that fibers having relatively large fineness within an appropriate fineness range are preferably used.

Furthermore, the fineness of the multifilaments is not particularly limited, and in order to prevent the side emission type optical fibers (32) from appearing on the vehicle interior outermost surface of the design material (3), and being abraded and scratched, the fineness is preferably from 1000 to 4000 dtex, particularly preferably from 2000 to 4000 dtex, and further particularly preferably from 2500 to 4000 dtex.

When the synthetic resin fibers (31) are the multifilaments, and the fineness of the side emission type optical fibers (32) is small, the fiber diameter of the multifilaments is prevented from becoming smaller than the diameter of the side emission type optical fibers 32 even if the diameter of the multifilaments is reduced by tension applied during weaving. This also makes it possible to suppress the side emission type optical fibers (32) from appearing on the outermost surface of the design material (3). The appearance of the side emission type optical fibers (32) on the outermost surface of the design material (3) can be more efficiently prevented also considering the functions and effects of the woven texture, yarn density, and fineness.

On the other hand, when the monofilaments are used as the synthetic resin fibers (31), the ratio ($d_{S2}/d_f$) of the fineness ($d_{S2}$) of the monofilaments to the fineness ($d_f$) of the side emission type optical fibers (32) is preferably from 1.5 to 6.0, more preferably from 1.5 to 4.0, and particularly preferably from 1.5 to 3.5. Thus, when the synthetic resin fibers (31) are the monofilaments, the abrasion of the monofilaments caused by the contact with an occupant and other articles, and the deformation of the monofilaments caused by pressing are less likely to occur as compared with the case of the multifilaments, so that fibers having relatively small fineness within an appropriate range are preferably used.

The fineness of the monofilaments is not particularly limited, and the fineness is preferably from 1000 to 3500 dtex, particularly preferably from 1000 to 3000 dtex, and further particularly preferably from 1000 to 2000 dtex in order to prevent the side emission type optical fibers (32) from protruding from the surface of the design material (3), and being abraded and scratched.

The number of the side emission type optical fibers (32) woven between the synthetic resin fibers (31) is not particularly limited, and it can be set to from 1 to 5 from the viewpoints of the design property of the design material (3) as an interior material, the form and strength of the design material (3) as a fabric, and the like. Furthermore, when the synthetic resin fibers (31) are the multifilaments, the number of the side emission type optical fibers (32) continuously woven can be set to from 2 to 5, and is preferably from 3 to 4.

On the other hand, the monofilaments make it possible to reflect light from the optical fibers utilizing its gloss to ensure sufficient luminance. Therefore, the number of the side emission type optical fibers (32) continuously woven can be reduced as compared with the case where the synthetic resin fibers (31) are the multifilaments. Specifically, the number of the side emission type optical fibers (32) can be set to from 1 to 3, and is preferably from 2 to 3. When the synthetic resin fibers (31) are the monofilaments, the design material (3) having an excellent design property and a good appearance can be provided even if the number of the side emission type optical fibers (32) continuously woven is 2, for example.

The same synthetic resin fibers as those of the synthetic resin fibers (31) may be used as the other (33) of the warps or wefts of the woven texture of the design material (3), or optional synthetic resins exemplified for the synthetic resin fibers (31) can be used in optional fineness.

The side emission type optical fibers (32) can take a form such that they do not appear on the outermost surface of the design material (3) and are woven at a deep position on the inner side, based on the woven texture, such as double-woven texture or triple-woven texture, of the woven fabric woven by using the side emission type optical fibers (32) and the synthetic resin fibers (31), and also by adjusting the yarn density.

The second interior part (5) includes the second base (6) provided so as to cover the end part (21) of the first base (2). The second interior part (5) may further include an optional member such as a fixture and a dressed lumber.

The end part of the second base (6) is bent at an optional bending radius, and the end surface of a bent end part (63) is brought into contact with or faces the design material (3). The contact means that no gap is formed between the end surface of the bent end part (63) and the surface of the design material (3). The facing state is a state where the bent end part (63) and the design material (3) are separated from each other such that a predetermined gap is formed between the end surface of the bent end part (63) and the surface of the design material (3). The predetermined gap is appropriately selected, and examples of the gap length include a gap length of from 0.1 to 3 mm (more preferably from 0.2 to 1 mm).

As with the first base (2), the second base (6) is usually a molded body made of a synthetic resin, and is molded into a predetermined interior part shape by a press-molding method in which heating and pressing are performed using a mold. The type of the synthetic resin is also not particularly limited as with the first base (2).

The light source (8) is a light source for causing the side emission type optical fibers (32) woven into the design material (3) to emit light. The light source (8) includes an optional light emitting part (81) such as an LED. The side emission type optical fibers (32) are connected such that the light emitting part (81) faces the end surface of one end part (321) of the side emission type optical fibers (32) of the design material (3).

In the light source (8), the end parts (321) of a plurality of side emission type optical fibers (32) are bundled, and the light emitting part 81 is disposed at a position facing the end surface thereof (see FIG. 4). When the end sides (321) of the plurality of side emission type optical fibers (32) are bundled, all of the side emission type optical fibers (32) woven into the design material (3) may be bundled if possible, depending on the shape and size (area) of the design material (3). A plurality of side emission type optical fiber bundles in which a predetermined number of the side emission type optical fibers (32) are bundled may be used.

The position at which the light source (8) is disposed can be optionally selected, and can be disposed, for example, on the first base (2), the second base (6), and the like. The light source can be disposed on the surface of an extended part (24) which is extended to the tip side of the attached design material (3) (see FIG. 5). The light source is disposed on the extended part (24), which makes it possible to protect the light source, and the optical fibers between the light source and the design material (3) so as to prevent impact, vibration, and the like from causing the light source and the optical fibers to be brought into contact with other regions during assembling, traveling of a vehicle, and the like.

Specific configuration examples of the interior part combined structure will be described below.

Example 1

Example 1 is a vehicle door trim for a passenger vehicle and the like shown in FIG. 6. The vehicle door trim is obtained by combining a first interior part 1 which is a lower trim, a second interior part 5 which is an upper trim, and a light source 8 (not shown). As shown in FIG. 1, the first interior part 1 includes a first base 2 made of a synthetic resin and a design material 3 which is a woven fabric attached to the first base 2 so as to cover the surface of the first base 2. The surface of an end part 21 and a light emitting surface 26 of the first base 2 are flat.

The second interior part 5 includes a second base 6 made of a synthetic resin. The second base 6 includes an end part bent toward the first base 2. The bent end part 63 includes an end surface disposed so as to be brought into contact with the surface of the design material 3.

As shown in FIGS. 2 and 3, the design material 3 is obtained by weaving synthetic resin fibers 31 of monofilaments or multifilaments, and 1 to 5 side emission type optical fibers 32 continuously woven between the synthetic resin fibers 31 as wefts.

A light source 8 is a light source using an LED. As shown in FIG. 4, a light emitting part 81 is connected to the side emission type optical fibers 32 so as to face the end surface of an end part 321 of each of the side emission type optical fibers 32. The light source 8 is locked to the first base 2, the second base 6, or the like (not shown).

As shown in FIG. 1, in such an interior part combined structure, the end part 21 and the light emitting surface 26 are flat, which cause no loss due to the bending of the optical fibers, so that the light emitting surface 26 is allowed to sufficiently emit light. As shown in FIG. 3, the side emission type optical fibers 32 are positioned inward relative to the synthetic resin fibers 31 without appearing on the outermost surface of the design material 3, which prevents the abrasion and scratch of the side emission type optical fibers 32 caused by the contact with an occupant, the bent end part 63 of the second base 6, and other articles, or suppresses at least the abrasion and scratch.

Example 2

As shown in FIG. 5, in a vehicle door trim in Example 2, a light source 8 is disposed on the surface of an extended part 24 which is extended from a tip side end part 21 of a design material 3 in the door trim of Example 1.

The light source 8 and end parts 321 of side emission type optical fibers 32 are positioned between a first base 2 and a second base 6, which makes it possible to protect the light source, and the optical fibers between the light source and the design material 3 so as to prevent impact, vibration, and the like from causing the light source and the optical fibers to be brought into contact with other regions during assembling, traveling of a vehicle, and the like.

It should be noted that the foregoing examples have been provided merely for the purpose of explanation and are not to be construed as limiting of the present invention. While the present invention has been described with reference to exemplary embodiments, it is understood that the words which have been used herein are words of description and illustration, rather than words of limitation. Changes may be made, within the scope of the appended claims, as described in detail herein, without departing from the scope and spirit of the present invention in its aspects. Although reference has been made herein to specific structures, materials and embodiments in the detailed description of the invention, the present invention is not intended to be limited to the particulars disclosed herein. Rather, the present invention extends to all functionally equivalent structures, methods and uses within the scope of the appended claims.

The present invention can be utilized in the technical field of interior parts which can be utilized as planar lighting, illumination, and the like. In particular, the present invention is useful in the technical field of vehicle interior parts such as a door trim and a roof trim.

What is claimed is:

1. An interior part combined structure obtained by combining a first interior part with a second interior part, the first interior part including a first base and a design material attached to the first base so as to cover at least a part of a surface of the first base, the second interior part including a second base provided so as to cover an end part of the first base,
wherein:
the design material is a woven fabric woven by using synthetic resin fibers and side emission type optical fibers as warps or wefts; the side emission type optical fibers each include one end part to which a light source is connected, wherein the side emission type optical fibers are straight; the one end part includes an end surface facing a light emitting part of the light source;
the second base includes a bent end part; and the bent end part includes an end surface brought into contact with the design material such that an end of the design material, from which the optical fibers extend, is interposed between the bent end part and an end part of the first base; and
the end part of the first base and a light emitting surface of the first base are flat.

2. The interior part combined structure according to claim 1, wherein:
the first base includes an extended part extended to a tip side of the attached design material, and the light source is disposed on a surface of the extended part; and
the light source is covered with the second base.

3. The interior part combined structure according to claim 2, wherein:
the side emission type optical fibers are woven between the synthetic resin fibers; and
a ratio ($d_S/d_f$) of fineness ($d_S$) of the synthetic resin fibers to fineness ($d_f$) of the side emission type optical fibers is from 1.5 to 7.0.

4. The interior part combined structure according to claim 2, wherein:
the side emission type optical fibers are woven between the synthetic resin fibers; and
a ratio ($d_S/d_f$) of fineness ($d_S$) of the synthetic resin fibers to fineness ($d_f$) of the side emission type optical fibers is from 1.5 to 7.0,
and wherein: the synthetic resin fibers are multifilaments; and a ratio ($d_{S1}/d_f$) of fineness ($d_{S1}$) of the multifilaments to fineness ($d_f$) of the side emission type optical fibers is from 2.0 to 7.0.

5. The interior part combined structure according to claim 2, wherein:
the side emission type optical fibers are woven between the synthetic resin fibers; and
a ratio ($d_S/d_f$) of fineness ($d_S$) of the synthetic resin fibers to fineness ($d_f$) of the side emission type optical fibers is from 1.5 to 7.0,
and wherein: the synthetic resin fibers are monofilaments; and a ratio ($d_{S2}/d_f$) of fineness ($d_{S2}$) of the monofilaments to fineness ($d_f$) of the side emission type optical fibers is from 1.5 to 6.0.

6. The interior part combined structure according to claim 1, wherein:
the side emission type optical fibers are woven between the synthetic resin fibers; and
a ratio ($d_S/d_f$) of fineness ($d_S$) of the synthetic resin fibers to fineness ($d^f$) of the side emission type optical fibers is from 1.5 to 7.0.

7. The interior part combined structure according to claim 1, wherein:
the side emission type optical fibers are woven between the synthetic resin fibers; and
a ratio ($d_S/d_f$) of fineness ($d_S$) of the synthetic resin fibers to fineness ($d_f$) of the side emission type optical fibers is from 1.5 to 7.0, and wherein: the synthetic resin fibers are multifilaments; and a ratio ($d_{S1}/d_f$) of fineness ($d_{S1}$) of the multifilaments to fineness ($d_f$) of the side emission type optical fibers is from 2.0 to 7.0.

8. The interior part combined structure according to claim 1, wherein:
the side emission type optical fibers are woven between the synthetic resin fibers; and
a ratio ($d_S/d_f$) of fineness ($d_S$) of the synthetic resin fibers to fineness ($d_f$) of the side emission type optical fibers is from 1.5 to 7.0,
and wherein: the synthetic resin fibers are monofilaments; and a ratio ($d_{S2}/d_f$) of fineness ($d_{S2}$) of the monofilaments to fineness ($d_f$) of the side emission type optical fibers is from 1.5 to 6.0.

9. The interior part combined structure according to claim 1, wherein:
the first base includes an extended part extended to a tip side of the attached design material, and the light source is disposed on a surface of the extended part; and
the light source is covered with the second base, and wherein the end part of the side emission type optical fibers is accommodated in a space defined between the first base and the second base.

10. The interior part combined structure according to claim 9, wherein:
the side emission type optical fibers are woven between the synthetic resin fibers; and
a ratio ($d_S/d_f$) of fineness ($d_S$) of the synthetic resin fibers to fineness ($d_f$) of the side emission type optical fibers is from 1.5 to 7.0.

11. The interior part combined structure according to claim 9, wherein:
the side emission type optical fibers are woven between the synthetic resin fibers; and
a ratio ($d_S/d_f$) of fineness ($d_S$) of the synthetic resin fibers to fineness ($d_f$) of the side emission type optical fibers is from 1.5 to 7.0,
and wherein: the synthetic resin fibers are multifilaments; and a ratio ($d_{S1}/d_f$) of fineness ($d_{S1}$) of the multifilaments to fineness ($d_f$) of the side emission type optical fibers is from 2.0 to 7.0.

12. The interior part combined structure according to claim 9, wherein:
the side emission type optical fibers are woven between the synthetic resin fibers; and
a ratio ($d_S/d_f$) of fineness ($d_S$) of the synthetic resin fibers to fineness ($d_f$) of the side emission type optical fibers is from 1.5 to 7.0,
and wherein: the synthetic resin fibers are monofilaments; and a ratio ($d_{S2}/d_f$) of fineness ($d_{S2}$) of the monofilaments to fineness ($d_f$) of the side emission type optical fibers is from 1.5 to 6.0.

* * * * *